US011327142B2

(12) United States Patent
Miers

(10) Patent No.: US 11,327,142 B2
(45) Date of Patent: May 10, 2022

(54) SYSTEMS AND METHODS FOR LOCATING AND TRACKING RADIO FREQUENCY TRANSMITTERS

(71) Applicant: Ball Aerospace & Technologies Corp., Boulder, CO (US)

(72) Inventor: Zachary T. Miers, Broomfield, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 0 days.

(21) Appl. No.: 16/834,491

(22) Filed: Mar. 30, 2020

(65) Prior Publication Data
US 2020/0309892 A1 Oct. 1, 2020

Related U.S. Application Data

(63) Continuation of application No. PCT/US2020/025395, filed on Mar. 27, 2020.

(60) Provisional application No. 62/826,086, filed on Mar. 29, 2019.

(51) Int. Cl.
*G01S 3/48* (2006.01)
*G01S 3/04* (2006.01)

(52) U.S. Cl.
CPC ............... *G01S 3/48* (2013.01); *G01S 3/043* (2013.01)

(58) Field of Classification Search
CPC .......... G01S 3/043; G01S 3/48; H04B 7/0671
See application file for complete search history.

(56) References Cited

U.S. PATENT DOCUMENTS

| 7,098,848 B2 | 8/2006 | Ksienski et al. |
| 2001/0029185 A1 | 10/2001 | Hildebrand et al. |
| 2002/0067315 A1 | 6/2002 | Kunysz |
| 2002/0126042 A1 | 9/2002 | Chang et al. |
| 2002/0175859 A1 | 11/2002 | Newberg et al. |
| 2002/0180639 A1 | 12/2002 | Rickett et al. |
| 2003/0020666 A1 | 1/2003 | Wright |
| 2003/0161261 A1 | 8/2003 | Weis |
| 2003/0206132 A1 | 11/2003 | Phelan et al. |
| 2003/0236096 A1 | 12/2003 | Yamazaki |

(Continued)

FOREIGN PATENT DOCUMENTS

EP 3443704 7/2019

OTHER PUBLICATIONS

International Search Report and Written Opinion for International (PCT) Patent Application No. PCT/US2020/025395, dated Jun. 8, 2020 16 pages.

(Continued)

*Primary Examiner* — Dao L Phan
(74) *Attorney, Agent, or Firm* — Sheridan Ross P.C.

(57) ABSTRACT

Transmitter tracking systems and methods are provided that utilize a phased array antenna. With the antenna forming a beam that is pointed in a first direction for a first frequency, a plurality of radio frequency (RF) signals, each associated with different carrier frequency and produced by a first transmitter, are received. The amplitudes of the received signals are used to determine whether the beam is pointed at the first transmitter. The amplitude information can also be used to determine a direction in which to point the beam if it is determined that the beam is not pointed at the first transmitter. The systems and methods can be applied to 5G, satellite communication, or other systems incorporating a phased array antenna.

20 Claims, 6 Drawing Sheets

(56) References Cited

U.S. PATENT DOCUMENTS

| | | |
|---|---|---|
| 2004/0085933 A1 | 5/2004 | Wang |
| 2005/0099354 A1 | 5/2005 | Durham et al. |
| 2005/0099356 A1 | 5/2005 | Durham et al. |
| 2005/0146476 A1 | 7/2005 | Wang et al. |
| 2005/0164744 A1 | 7/2005 | du Toit |
| 2005/0285785 A1 | 12/2005 | Martin et al. |
| 2006/0114164 A1 | 6/2006 | Iluz et al. |
| 2006/0145921 A1 | 7/2006 | Ranta et al. |
| 2007/0097006 A1 | 5/2007 | Brown et al. |
| 2007/0293150 A1 | 12/2007 | Ezal et al. |
| 2008/0117105 A1 | 5/2008 | Chen et al. |
| 2008/0278394 A1 | 11/2008 | Koh et al. |
| 2009/0002165 A1 | 1/2009 | Tuttle |
| 2009/0102704 A1 | 4/2009 | Fujimura |
| 2009/0167605 A1 | 7/2009 | Haskell |
| 2009/0189823 A1 | 7/2009 | Adamski |
| 2009/0273533 A1 | 11/2009 | Wolf et al. |
| 2010/0052975 A1 | 3/2010 | Milano et al. |
| 2010/0097290 A1 | 4/2010 | Legay et al. |
| 2010/0253574 A1 | 10/2010 | Mizutani et al. |
| 2011/0156694 A1 | 6/2011 | de Graauw |
| 2011/0285576 A1 | 11/2011 | Lynam |
| 2011/0309981 A1 | 12/2011 | Huizing |
| 2012/0280861 A1 | 11/2012 | Kishimoto et al. |
| 2013/0027250 A1 | 1/2013 | Chen |
| 2013/0099987 A1 | 4/2013 | Desclos et al. |
| 2013/0163705 A1 | 6/2013 | Stirland |
| 2014/0035694 A1 | 2/2014 | Narita et al. |
| 2014/0184454 A1 | 7/2014 | Shamblin et al. |
| 2014/0313073 A1 | 10/2014 | DiNallo et al. |
| 2015/0077290 A1 | 3/2015 | Veysoglu et al. |
| 2016/0021650 A1 | 1/2016 | Chembil-Palat et al. |
| 2016/0091601 A1 | 3/2016 | Karr |
| 2016/0226141 A1 | 8/2016 | Lee |
| 2016/0238699 A1 | 8/2016 | Ryba et al. |
| 2017/0077576 A1 | 3/2017 | Kirino |
| 2017/0223749 A1 | 8/2017 | Sheldon et al. |
| 2017/0293074 A1 | 10/2017 | Park et al. |
| 2017/0346195 A1 | 11/2017 | Yamamoto et al. |
| 2018/0013210 A1 | 1/2018 | Rosenkrantz et al. |
| 2018/0038935 A1 | 2/2018 | Iizuka et al. |
| 2018/0048382 A1 | 2/2018 | DiNallo et al. |
| 2018/0085091 A1 | 3/2018 | Hayashi |
| 2018/0108964 A1 | 4/2018 | Adas et al. |
| 2018/0115062 A1 | 4/2018 | Cummings et al. |
| 2018/0128910 A1 | 5/2018 | Lee |
| 2018/0192298 A1 | 7/2018 | Noerpel et al. |
| 2018/0246390 A1 | 8/2018 | Park et al. |
| 2018/0356705 A1 | 12/2018 | Park et al. |
| 2018/0375722 A1 | 12/2018 | Gohary et al. |
| 2019/0020107 A1 | 1/2019 | Polehn et al. |
| 2019/0237869 A1 | 8/2019 | Takahashi |
| 2019/0326664 A1 | 10/2019 | Zhu |
| 2019/0348761 A1 | 11/2019 | Miehle |
| 2019/0369200 A1 | 12/2019 | Finger et al. |

OTHER PUBLICATIONS

International Preliminary Report on Patentability for International (PCT) Patent Application No. PCT/US2020/025395, dated Oct. 14, 2021 13 pages.

SYSTEMS AND METHODS FOR LOCATING AND TRACKING RADIO FREQUENCY TRANSMITTERS

CROSS-REFERENCE TO RELATED APPLICATIONS

This application claims the benefit of U.S. Provisional Patent Application Ser. No. 62/826,086, filed Mar. 29, 2019, and is a continuation of International Application Number PCT/US20/25395, filed Mar. 27, 2020, the entire disclosures of which are hereby incorporated herein by reference.

FIELD

The present disclosure is directed to systems and methods for locating and tracking a radio frequency transmitter using a phased array antenna system.

BACKGROUND

Radio frequency (RF) communication links are increasingly being used to transfer information and to control devices. A number of emerging communication systems, including but not limited to 5G communications systems, make use of relatively short wavelength, high-frequency signals, in order to support ever increasing data rates. However, the wavelengths of such signals have poor penetration characteristics, making them problematic when used in urban environments, indoors, and in other environments in which a direct line of sight between a base station and a remote device is not consistently available. This problem has been addressed, at least in part, by using phased array antennas, which are capable of forming beams having a high amount of gain directed in a desired direction, and further of steering the beam. Moreover, phased array antennas are capable of supporting multiple beams simultaneously.

In order to appropriately direct a beam formed by a phased array or other directional antenna, knowledge of the direction to the remote device, relative to the base station, is required. For example, in a communication system, determining an angle of arrival can be used to point a beam toward a remote communication node in order to increase the signal to noise ratio (SNR) of communications. Moreover, tracking the location of a remote device that is moving relative to the base station is a requirement for ensuring that desired signal strength is maintained.

Conventional techniques for determining the angle of arrival of a radio frequency signal at an antenna incorporating a two-dimensional array of elements require a large number of computations and an exhaustive "search" in angle-angle space. Accordingly, the determination of an angle of arrival of a radio frequency signal at a planar two-dimensional array has required relatively large amounts of computational power and time.

In many communication systems, a single communication channel is transmitted using several different frequencies or a span of frequencies, in order to reduce interference and crosstalk. This type of arrangement can be problematic for a phased array antenna, because the actual pointing location of a beam produced by a phased array antenna varies with frequency. Moreover, this effect increases as the scan angle relative to the plane of the phased array antenna increases. Therefore, accurately directing a beam of a phased array antenna in such systems, particularly at large scan angles, is problematic.

Accordingly, it would be desirable to provide systems and methods capable of efficiently determining an angle of arrival of RF energy at a phased array antenna.

SUMMARY

In accordance with embodiments of the present disclosure, a phased array antenna system is provided that utilizes various characteristics and properties of phased array antenna architectures to enable the location tracking of the transmitting source. Specifically, the slope difference between the observed amplitude of a received signal at different frequency points can be characterized to determine the required tracking update, even if the corrected pointing location is not within the measured frequency range.

Methods in accordance with embodiments of the present disclosure include receiving a signal at a phased array antenna while a first phase taper is applied. A signal strength for each of a plurality of carrier frequencies included in the signal, or across a range of frequencies encompassed by the signal, is determined. A slope or slopes described by the strength of the signals can be used in selecting a revised or second phase taper to be applied. Embodiments of the present disclosure also can include determining a bearing to a signal source or transmitter based on the determined signal strengths and the applied phase taper.

Systems in accordance with embodiments of the present disclosure include a phased array antenna system having a phased array antenna, a feed network, a transceiver, a processor, and memory. The memory can store application programming that can be executed by the processor. The application programming can operate to determine the signal strengths of a plurality of carrier frequencies received at the array antenna while a first phase taper is applied. The application programming can further operate to apply a second phase taper in place of the first phase taper in response to a determination that an amplitude of the signal at a center frequency is less than the amplitudes of signals on either side of the signal at the center frequency, or in response to a determination that the slopes described by the amplitudes of the signals on either side of the center frequency amplitude are asymmetrical. In accordance with further embodiments, a slope or slopes described by the strength of the signal can be applied to select a second phase taper. The second phase taper may be one of a plurality of phase tapers stored as part of a table in the memory. The taper applied to accurately point the beam for a selected frequency at the transmitter can be used to determine a bearing to the transmitter.

Additional features and advantages of embodiments of the disclosed systems and methods will become more readily apparent from the following description, particularly when taken together with the accompanying drawings.

DETAILED DESCRIPTION

Embodiments of the present disclosure provide systems and methods for locating and tracking a transmitter relative to a phased array antenna. More particularly, embodiments of the present disclosure consider the slope of the frequency spectrum amplitudes for multiple frequencies associated with a signal from a transmitter in order to correctly point a beam of the phased array at the transmitter.

Figure 1:
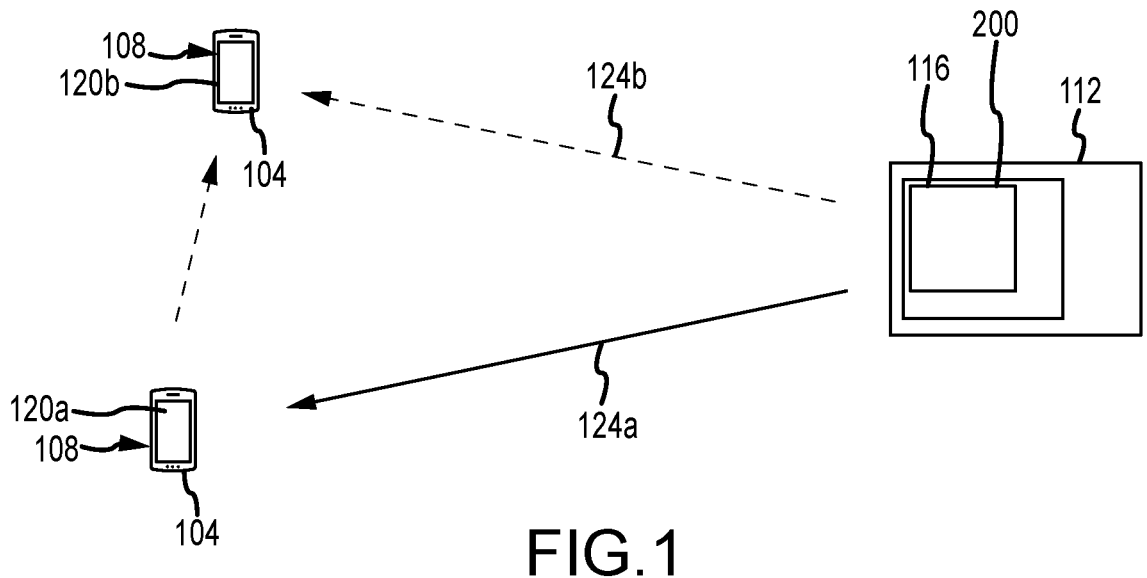
FIG. 1 depicts a scenario in which a remote device is moving relative to a base station.

Communication systems often utilize a number of different carrier frequencies in order to transmit a signal. Other communication systems operate over a span or range of frequencies. In order to ensure desired levels of performance, antennas capable of forming highly directional beams, such as a phased array antenna, can be used to advantage. However, directional beam patterns require accurate pointing of the beam. Moreover, where a transmitter is moving relative to a base station, tracking the location of the transmitter as it moves relative to the base station is necessary. For example, as depicted in FIG. 1, as a transmitter 104 provided as part of a remote device 108 moves relative to a base station 112 incorporating a phased array antenna or antenna system 116 having an antenna array 200 from a first location 120a at time T1 to a second location 120b at time T2, it is necessary to adjust the direction of the beam 124 produced by the phased array antenna system 116 to ensure desired levels of gain. For instance, by applying a first signal or phase taper at time T1 a first beam 124a directed in a first direction can be formed, and by applying a second phase or signal taper at time T2 a second beam 124b directed in a second direction can be formed.

Figure 2:
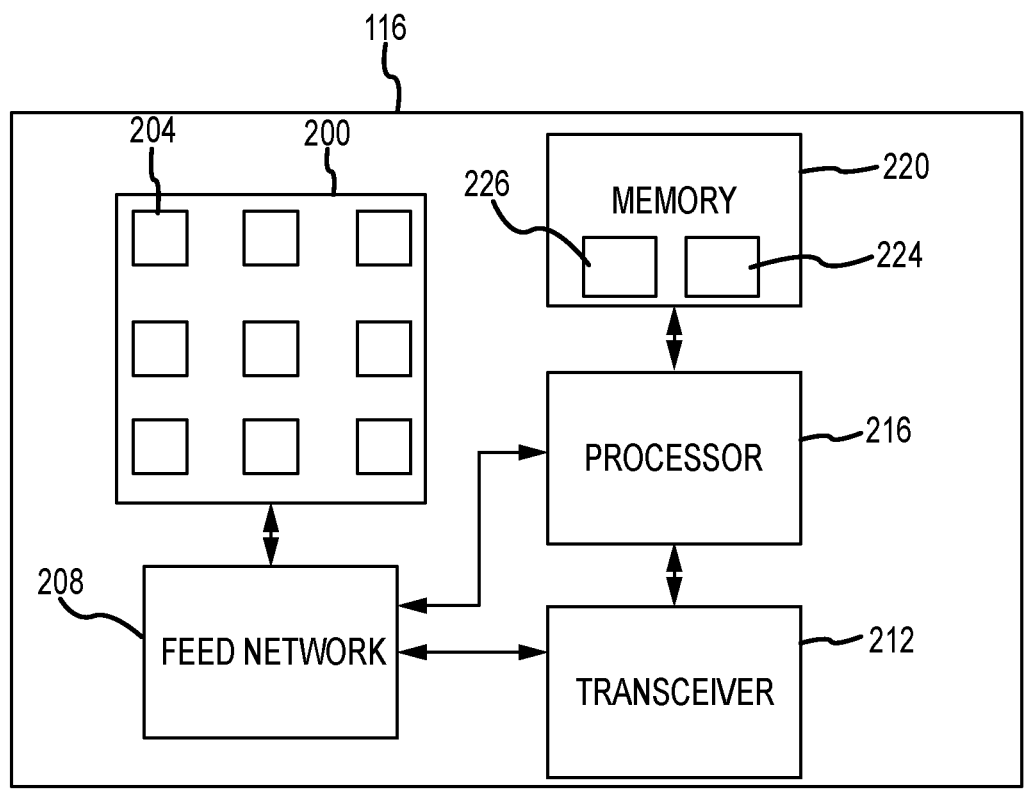
FIG. 2 is a block diagram depicting an example of a phased array antenna system that can be operated in accordance with embodiments of the present disclosure to communicate with a remote device and to determine a location of the remote device.

FIG. 2 is a functional block diagram depicting components of a phased array antenna system 116 that can be operated to communicate with a transmitter 104 provided as part of a remote device 108 and to determine a location of the remote device 108 relative to the base station 112 in accordance with embodiments of the present disclosure. In this example, the phased array antenna system 116 includes an antenna array 200 having a number of rows and columns of antenna elements 204. In accordance with at least some embodiments of the present disclosure, the spacing between antenna elements 204 in a row direction is different than the spacing between antenna elements 204 in a column direction. A feed network 208 connects the antenna elements 204 to a transceiver 212. The feed network 208 can include phase shifters, amplifiers, switches, or other devices. The transceiver 212 can operate to receive, transmit, or transmit and receive radio frequency signals. More particularly, the transceiver 212 can modulate or demodulate one or more RF carrier signals. As can be appreciated by one of skill in the art after consideration of the present disclosure, by controlling a phase delay, amplitude, or other parameters of individual antenna elements 204, the direction of the beam 124 produced by the phased array antenna system 116 can be controlled in elevation and azimuth.

The antenna system 116 can additionally include a processor 216 and memory and/or data storage 220, hereinafter referred to simply as memory 220. The processor 216 can include a general purpose programmable processor, field programmable gate array (FPGA), controller, or other device or devices alone or in combination. The processor 216 can operate in connection with the memory 220 to execute application programing or instructions. The memory 220 can include volatile and nonvolatile memory or data storage, such as RAM, SDRAM, solid-state memory, hard disk drives, or the like, alone or in various combinations. The memory 220 can store application instructions 224, including instructions for adjusting a pointing of a beam produced by the array 200 in a desired direction, and in particular towards a transmitter 104. The memory can also store reference information, such as a preload table or other tables 226 containing operational parameters that can be applied by the phased array antenna system 116 to point a beam 124 produced by the phased array antenna system 116 in a selected direction for a selected frequency.

In accordance with at least some embodiments of the present disclosure, the antenna array 200, the feed network 208, and the transceiver 212 provide multiple-input multiple-output capabilities. In accordance with other embodiments of the present disclosure, MIMO capabilities are not included, as they are not required when embodiments of the present disclosure are applied to systems operating at multiple frequencies or that are modulated over a range of frequencies.

As can be appreciated by one of skill in the art after consideration of the present disclosure, the beam 124 produced by a phased array antenna system 116 can be pointed by varying parameters of the signals provided to the antenna elements 204 included in the array 200. As can further be appreciated by one of skill in the art after consideration of the present disclosure, this pointing is frequency dependent. Accordingly, phased array antennas experience beam pointing errors, such that the pointing of a beam 124 produced by an antenna array 200 for a first frequency is different than the pointing of the beam produced by the antenna array 200 for a second frequency, where parameters other than frequency are held constant. This is depicted in FIGS. 3A-C, which illustrate the variation in scan location relative to an antenna array 200 for signals emanating from a single remote transmitter 104, but having or spanning a number of different frequencies.

Figure 3A:
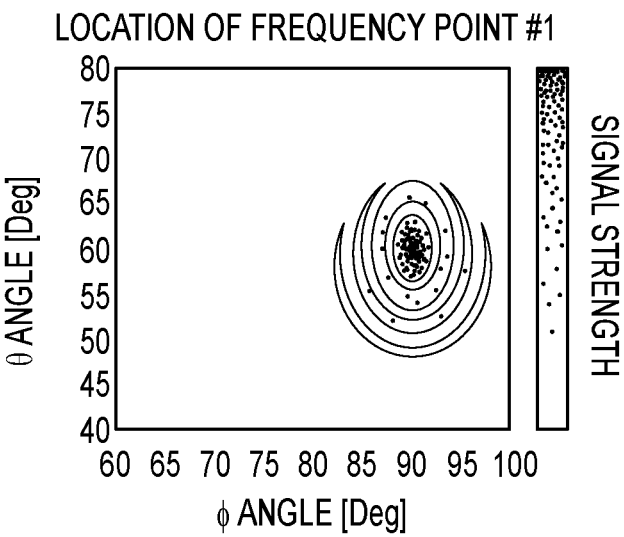
FIGS. 3A-C illustrate variations in scan location of a phased array antenna for signals at different frequencies.
Figure 3B:
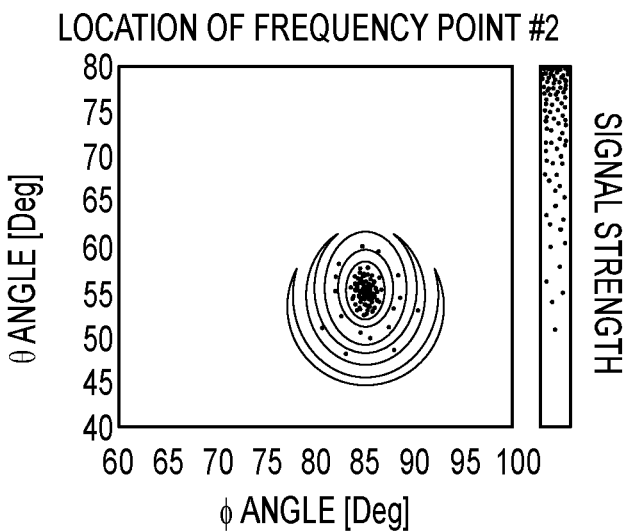
Figure 3C:
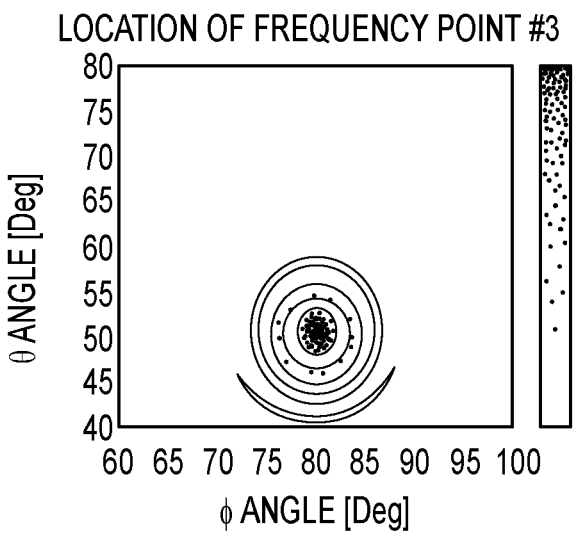

FIG. 3A depicts an example of the signal strength and location of a signal received at an antenna array 200 of the antenna system 116. In particular, when the scan location for the antenna array 200 is controlled such that the beam 124 produced by phased array antenna system 116 is pointed at an azimuth of 85° and an elevation of 55° for a signal at a second frequency, the scan location for a signal at a first frequency is centered at an azimuth of 90° and an elevation of 60°. In FIG. 3B, the location of the strongest signal for the second frequency corresponds to the pointing direction of the phased array antenna system 116 for that second frequency, in this example an azimuth of 85° and an elevation of 55°. In FIG. 3C, while the scan location of the antenna array 200 of the antenna system 116 is controlled such that the beam 124 produced by the phased array antenna system 116 is pointed at an azimuth of 85° and an elevation of 55° for a signal at the second frequency, a signal of a third frequency is received at a scan location having an azimuth of 80° and an elevation of 50°. In summary, while the scan angle of a phased array antenna system 116 is pointed to maximize the signal gain for a signal having a selected frequency, the directions of maximum gain for signals at different frequencies will be different. This frequency dependency in the pointing of a phased array antenna has been seen as a challenge in operating systems spanning a range of frequencies, as off-axis beam pointing results in reduced signal gain. However, this frequency dependency in the pointing of phased array antennas is used to advantage by embodiments of the present disclosure to determine a desired pointing direction for a beam, and/or the bearing to a transmitter 104.

Figure 4:
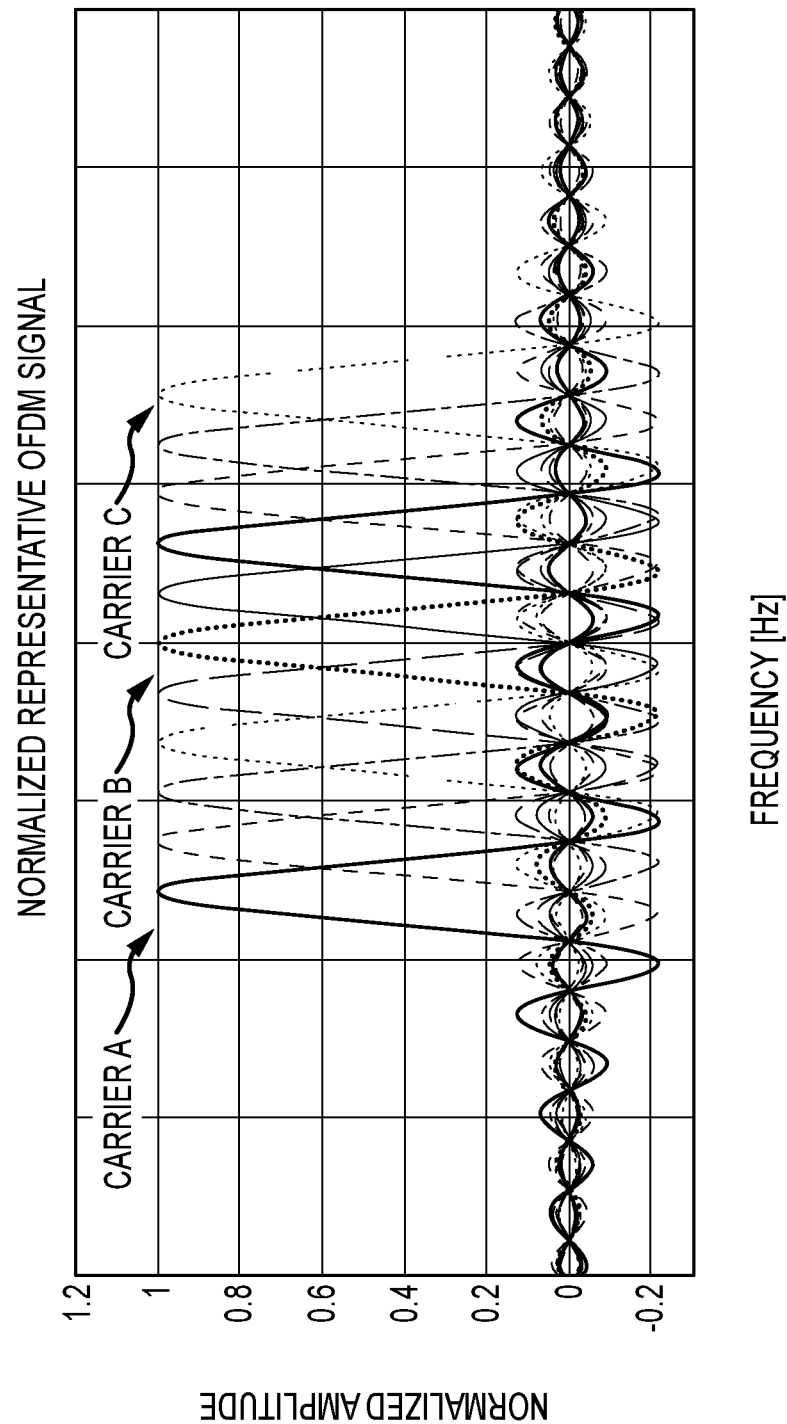
FIG. 4 illustrates an idealized signal transmitted using multiple different frequencies.

FIG. 4 illustrates an idealized signal transmitted using multiple different frequencies, for example as part of an orthogonal frequency-division multiplexing (OFDM) signal. As shown in the figure, the amplitude of the signals for each of the different carrier wavelengths in this idealized scenario is the same.

Figure 5:
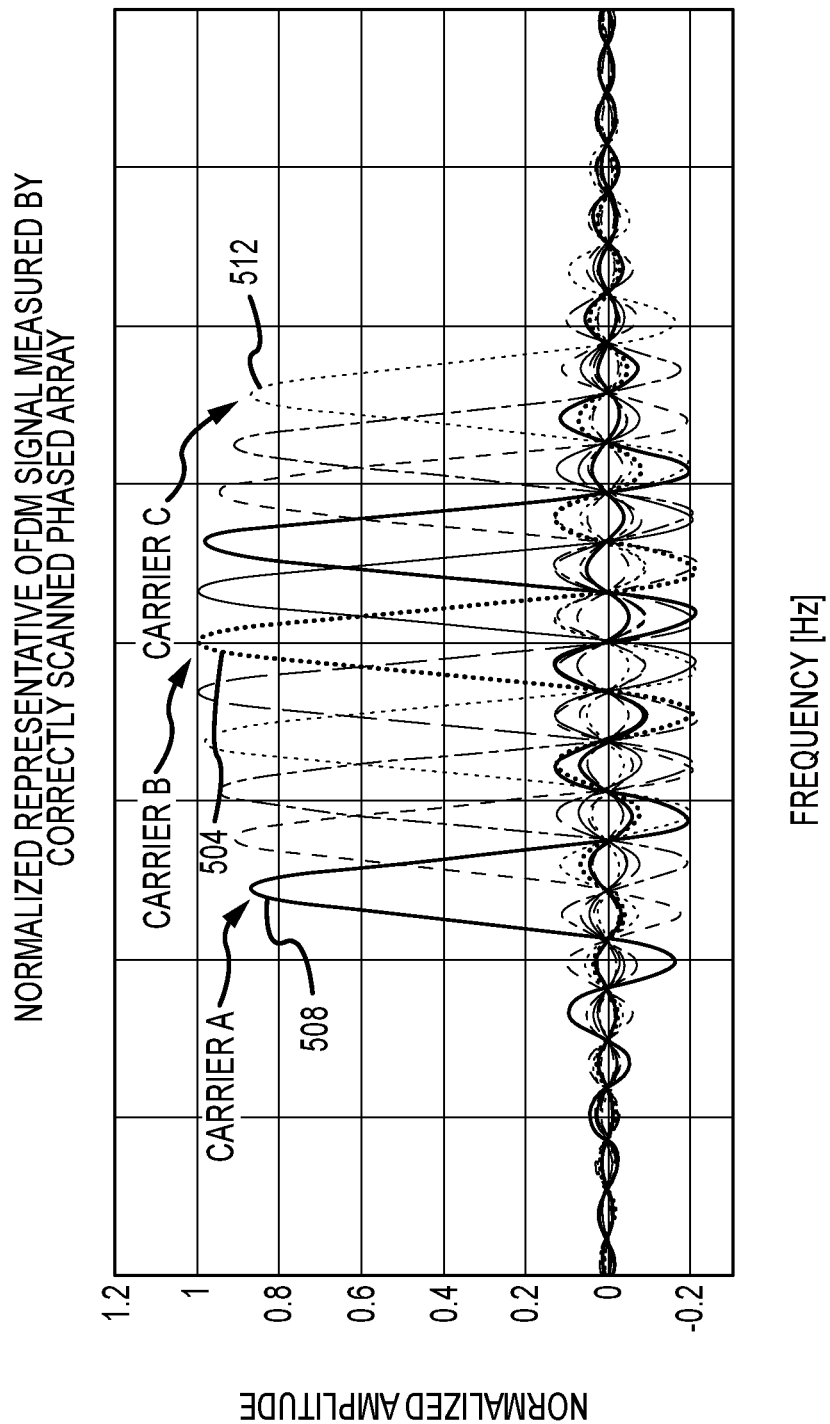
FIG. 5 illustrates the amplitudes of a signal transmitted using multiple different frequencies as received by a phased array antenna that is correctly pointed at the transmitter.

Because the direction of a beam 124 produced by a phased array antenna system 116 shifts with frequency, the amplitude of signals associated with different carrier wavelengths received at a phased array antenna system 116 will differ from one another in a real world scenario. FIG. 5 illustrates the amplitudes of a signal transmitted using multiple different components or frequencies as received by a phased array antenna system 116 that is correctly pointed at the transmitter 104 for one of the multiple frequencies. As shown, a normalized representative OFDM signal will exhibit non-equal peak amplitudes for the different carrier frequency components of the OFDM signal. Specifically, the maximum peak amplitude corresponds to a peak amplitude of carrier B 504. The peak amplitude of carrier A 508 and the peak amplitude of carrier B 512 are less than the peak amplitude of carrier B 504. These differences in the peak amplitudes for signals at different frequencies are a result of the inability of a phased array antenna system 116 to be scanned at the same location for multiple frequencies at the same time instance. However, it is also apparent that the peak amplitudes of the carriers are symmetric across the signal bandwidth. Accordingly, the slopes described by the peak signal strengths 508 and 512 on either side of the maximum peak signal strength (i.e. the signal strength of the signal at the center carrier frequency, here carrier B) 504 are equal. In this example, the peak signal strength of carrier A 508 and the peak signal strength of carrier C 512 have the same signal strength, and carrier B has a peak signal strength that is greater than any other carrier. Moreover, carrier A may have a frequency that is less than a frequency of carrier B, and carrier B may have a frequency that is less than carrier C. Where a measured frequency span has this type of signal characteristics, the phased array antenna 112 is correctly tracked to the target transmitter 104 in a first dimension. In particular, where the slopes described by the peak amplitudes of the waveform about the center frequency are symmetrical, the beam 124 is correctly pointed at the transmitter in at least a first dimension. The accuracy of the tracking in a second dimension can be determined through the slope characteristics of the measured waveform. In particular, the rate of frequency roll-off is dependent on scan angle. Therefore, provided the spacing of antenna elements 204 in the x-dimension is different than the spacing of antenna elements 204 in the y-dimension, the slope (i.e. the derivative) of the roll-off is different in each dimension. Accordingly, the direction the beam 124 needs to move in to correct or improve the pointing can be determined in at least most pointing angles relative to the array 200. Provided the angle to the transmitter 104 is not the same relative to the rows and columns of antenna elements 204, the dimension in which the pointing of the beam 124 needs to be adjusted can even be determined in an array 200 with equal spacing between elements in the x and y dimensions.

Figure 6:
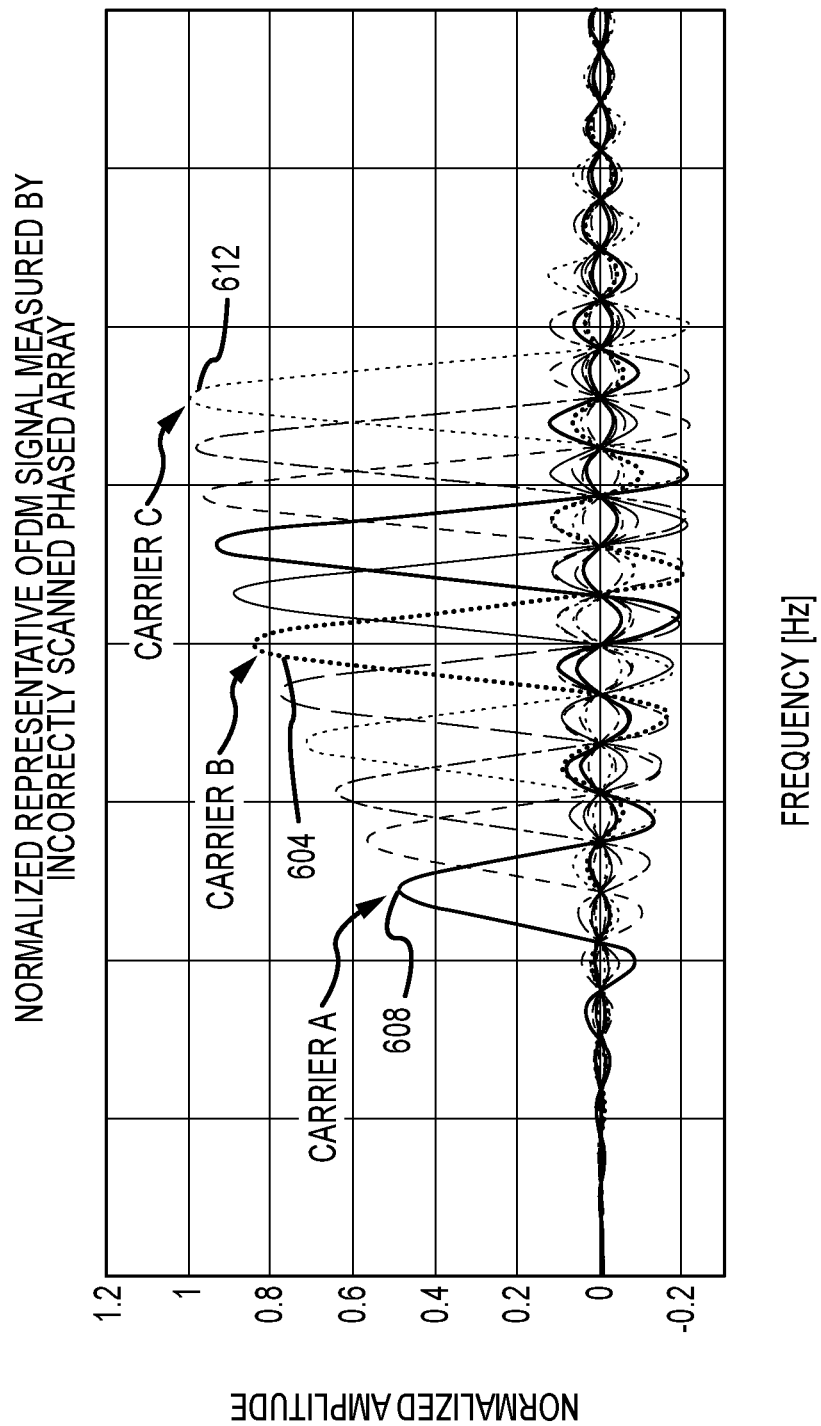
FIG. 6 illustrates the amplitudes of a signal transmitted using multiple different frequencies as received by a phased array antenna that is incorrectly pointed at the transmitter.

FIG. 6 illustrates the amplitudes of a signal transmitted using multiple different frequencies as received by a phased array antenna system 116 that is incorrectly pointed at the transmitter 104. The carrier frequencies of the signals can be the same as in the example of FIG. 5. Here, the peak or maximum signal strength of carrier A 608 is less than the maximum signal strength of carrier B, which is less than the maximum signal strength of carrier C 612. Where, as in this example, the greatest signal amplitude lies on or towards one end of the frequency spectrum, the slope difference between the maximum amplitudes 604, 608, and 612 for the different frequencies can be characterized to determine the required tracking update, even if the correct pointing location is not within the measured frequency range. In general, where the beam 124 is incorrectly pointed, the amplitudes of the signals describe slopes that are asymmetric across the signal bandwidth, or that are all positive or all negative. The beam 124 is also incorrectly pointed where the center frequency peak amplitude is less than the peak amplitudes of one of the other frequencies. In accordance with embodiments of the present disclosure, the characteristics of the slope or slopes of the peak amplitudes across the frequency spectrum of the signal bandwidth provides information regarding the amount and direction in which the antenna system 116 beam 124 must be scanned to correctly track the signal transmitter 104. This tracking technique can be applied to any 2-D linear array. More particularly, the actual pointing location can be determined using the array information. For example, the following array factor equations can be utilized:

$$AF_{planar}(\theta, \phi) = \sum_{n=1}^{n=N} \sum_{m=1}^{m=M} I_{nm} \cdot e^{j \cdot (\delta_{nm} + k \cdot d \cdot n \cdot \sin\theta \cdot \cos\phi + k \cdot d \cdot m \cdot \sin\theta \cdot \sin\phi)} \quad \text{Eqn. 1}$$

$$\Delta\varphi = \frac{360° \cdot d \cdot \sin\Theta_S}{\lambda} \quad \text{Eqn. 2}$$

where Eqn. 1 is the well-known array factor equation, and Eqn. 2 is the well-known 1D pointing equation.

Figure 7:
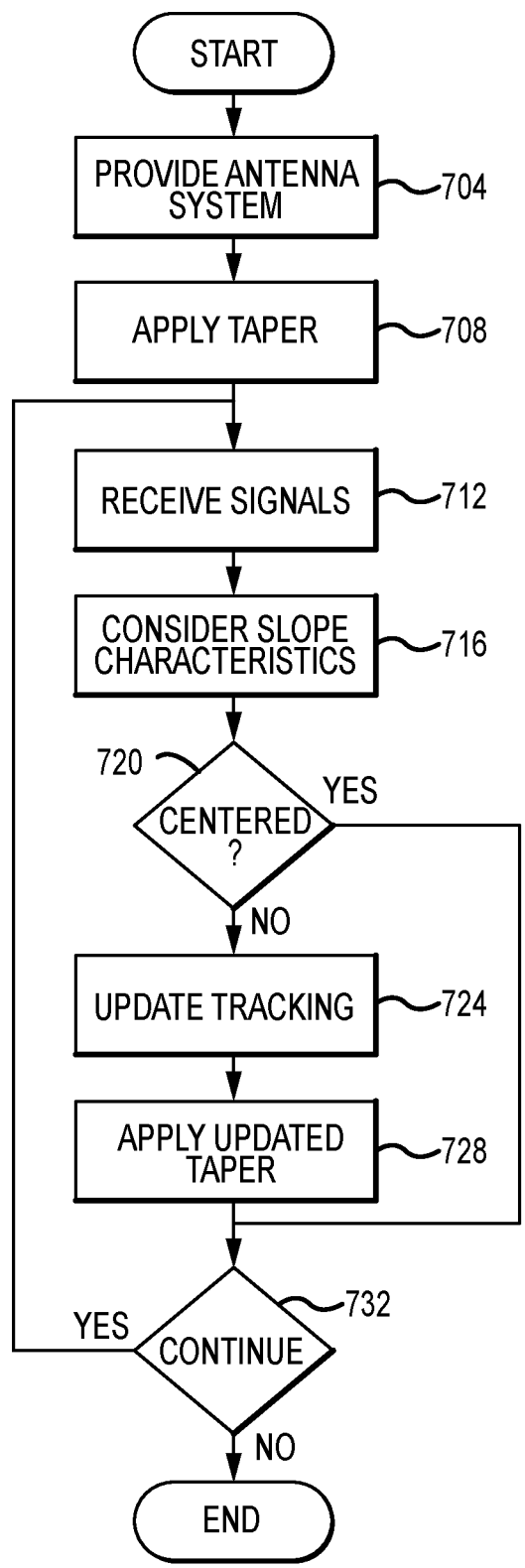
FIG. 7 is a flowchart depicting aspects of a process for correctly pointing a phased array antenna in accordance with embodiments of the present disclosure.

FIG. 7 is a flowchart depicting aspects of a process for correctly pointing a phased array antenna in accordance with embodiments of the present disclosure. Initially, at step 704, a phased array antenna system 116 is provided. The phased array antenna system 116 includes a plurality of antenna elements 204 disposed in an array 200 with known dimensions and spacing. At step 708, a phase taper is applied, for example by controlling phase shifters, amplifiers, switches, or other elements provided as part of the feed network 208 and connected to the phased array antenna system 116, to point a beam of the phased array antenna system 116 at a first location, for at least a first frequency. The parameters for controlling the components or elements of the feed network 208 can be obtained from a preload table 226. While the phased array antenna system 116 is pointed in the first direction for the first frequency, a signal that includes signal components having different carrier frequencies are received (step 712). In accordance with embodiments of the present disclosure, the received signal includes at least three different carrier frequencies. The different signal components can be sequenced in time. Alternatively, a signal simultaneously spanning a range of carrier frequencies, or a signal modulated such that it spans a range of frequencies, can be used. The slope characteristics of the peak amplitudes of the measured waveforms for the signal components at the different carrier frequencies are then considered (step 716). For example, the location of a maximum peak amplitude and the angle of each of the slopes described by the peak amplitudes on either side of the maximum peak amplitude can be determined. In accordance with the least some embodiments of the present disclosure, the peak amplitudes can be determined from received signal strength indication (RSSI), power, or other metrics.

At step 720, a determination is made as to whether the beam formed by the phased array antenna system 116 is centered on the transmitter 104 device. For example, the location of the maximum peak signal relative to locations of the peak signals on either side can be used to determine whether the maximum peak signal is centered, and therefore whether the beam 124 is accurately pointed. For instance, where the maximum peak signal is associated with a center carrier frequency, and the peak signals for the carrier frequencies on either side of the center carrier frequency have the same amplitude as one another, such that the slopes on either side of the center frequency are symmetrical to one another, it can be concluded that the beam 124 is properly pointed in at least one dimension. The slope characteristics (i.e. the derivatives) of the measured waveform can be used to determine the accuracy of the beam 124 pointing in the second dimension. As another example, if the absolute values of the angles of the slopes produced by the peak amplitudes of the signals on either side of a maximum peak signal are equal (e.g. the slope of the peak amplitudes on a first side of the maximum signal amplitude is +10° and the slope on a second side of the maximum signal amplitude is −10°), the beam 124 is accurately pointed in at least one dimension. As another example, if the absolute values of the slope angles of the peak amplitudes on either side of the maximum signal amplitude are within some predetermined angular range of one another of a peak signal are within some predetermined range of one another (e.g. the absolute value of the slope angle of the peak amplitudes on a first side of the maximum signal amplitude is within 5° of the absolute value of the slope angle on a second side of the maximum signal amplitude), the beam 124 is accurately pointed in at least one dimension. Moreover, embodiments of the present disclosure can evaluate the pointing of the beam 124 in two dimensions (e.g. in azimuth and elevation). In accordance with further embodiments of the present disclosure, the signals from rows of antenna elements 204 within the array 200 can be evaluated for determining the pointing of the beam 124 in a first dimension, and the signals from columns of antenna elements 204 within the array 200 can be evaluated for determining the pointing of the beam 124 in a second dimension. Where the pointing is determined to be centered on the transmitter 104, the phase taper used to achieve that pointing can be applied to determine a bearing or direction to the transmitter 104.

If it is determined that the beam should be realigned, the required tracking or beam 124 pointing update can be determined from the slope difference between the different frequency points from the received signals (step 724). Parameters applied to the feed network 208 to update the beam 124 pointing can be obtained from a preload table 226. Alternatively, the parameters applied in order to update the beam pointing can be calculated. In accordance with at least some embodiments of the present disclosure, the relative characteristics of the slopes described by the peak amplitudes can be considered to select a set of taper parameters or a beam pointing direction that is likely to more accurately point the beam 124. In accordance with other embodiments of the present disclosure, a new set of taper parameters can be selected randomly or pseudo-randomly. The taper parameters associated with the updated pointing direction can then be applied (step 728). After applying a tracking update, or if the beam is determined to be properly centered or aligned, a determination can be made as to whether the tracking operation should continue (step 732). If operation should be continued, the process can return to step 712. Alternatively, the process can end.

As can be appreciated by one of skill in the art after consideration of the present disclosure, methods for determining the beam 124 pointing accuracy of an antenna system 116 in accordance with embodiments of the present disclosure leverage the frequency offset inherent in phased array antennas to solve a key problem affecting various systems. In addition, embodiments of the present disclosure can provide improved angular resolution as the frequency spread of signals associated with a particular system increases. Accordingly, in systems where accurate pointing of a beam 124 is generally more important to the operation of the system, the performance of the pointing techniques disclosed herein increases. Similarly, embodiments of the present disclosure can provide increased tracking signal quality as the scan angle increases. Accordingly, embodiments of the present disclosure provide good performance in critical operating conditions. The processing power required by embodiments of the present disclosure can be less than that required by other systems. In addition, implementation does not require guess and check methods, and can be applied at low signal-to-noise ratios without significant decreases in accuracy.

Embodiments of the present disclosure can be applied to a phased array antenna system 116 operating in connection with signals spanning multiple frequencies. For instance, but without limitation, embodiments of the present disclosure can be operated in connection with orthogonal frequency-division multiplexing signals. As another example, embodiments the present disclosure can be operated in connection with systems in which signals are transmitted using at least three carrier frequencies. Still other embodiments of the present disclosure can be operated in connection with signals in which a carrier frequency is modulated across a range of wavelengths. Moreover, embodiments of the present disclosure can be usefully applied in any system in which pointing a beam 124 of the phased array antenna system 116 is required or desired. Examples of systems in which embodiments of the present disclosure can be applied include, but are not limited to, 5G communication systems, other mmWave systems, Ku, K, Ka, Q, and W band systems, including but not limited to satellite communications systems. In an example implementation, but without limitation, an antenna system 116 as disclosed herein can be included in a communication system (e.g. a 5G communication system) base station. Although various embodiments have been discussed in which the associated signals include multiple carrier frequencies or a range of frequencies, other embodiments can operate in connection with a signal utilizing a single carrier frequency, provided the antenna system 116 has multiple input multiple output (MIMO) capabilities.

Embodiments of the present disclosure can be applied to update the pointing or scan angle of a phased array antenna system 116, in order to maximize the signal strength or gain of the antenna system 116. In addition, a direction or bearing to a transmitter or other signal source can be determined. This allows an antenna system 116 in accordance with embodiments of the present disclosure to maintain optimal antenna system 116 performance even in dynamic environments, including environments in which a bearing from the antenna system 116 to a transmitter 104 is changing.

The foregoing description has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A method for steering a phased array antenna system, comprising:
    applying a first phase taper to an antenna array of the phased array antenna system;
    receiving a signal having a plurality of carrier frequencies at the phhased array antenna system while the first phase taper is applied, wherein the plurality of carrier frequencies includes at least first, second, and third carrier frequencies wherein a frequency of the first carrier frequency is less than a frequency of the second carrier frequency of the third carrier frequency;
    determining a peak signal strength of each of the first, second, and third carrier frequencies while the first phase taper is applied; and
    applying a second phase taper to the antenna array of the phased array antenna system in response to a determination that the peak signal strength of the second carrier frequency is not greater than the peak signal strengths of one of the first carrier frequency or the third carrier frequency.

2. The method of claim 1, further comprising:
    determining a peak signal strength for each of the first, second, and third carrier frequencies while the second phase taper is applied; and
    determining that the phased array antenna is properly steered where the peak signal strength of the first carrier frequency is equal to the peak signal strength of the third carrier frequency.

3. The method of claim 1, further comprising:
    where the peak signal strength of the first carrier frequency is equal to the peak signal strength of the third carrier frequency while the second phase taper is applied, determining a bearing to a transmitter of the received signal based on the second phase taper.

4. A method for steering a phased array antenna system, comprising:
    applying a first phase taper to an antenna array of the phased array antenna system;
    receiving a signal having a plurality of carrier frequencies at the phased array antenna system while the first phase taper is applied, wherein the plurality of carrier frequencies includes at least first, second, and third carrier frequencies, wherein a frequency, and wherein a frequency of the second carrier frequency is less than a frequency of the third carrier frequency;
    determining a peak signal strength for each of the first, second, and third carrier frequencies while the first phase taper is applied; and
    where the peak signal strength of the first carrier frequency is equal to the peak signal strength of the third carrier frequency while the first phase taper is applied, determining a bearing to a transmitter of the received signal based on the first phase taper.

5. A method for steering a phased array antenna system, comprising:
    applying a first phase taper to an antenna array of the phased array antenna system;
    receiving a signal having a plurality of carrier frequencies at the phased array antenna system while the first phase taper is applied, wherein the plurality of carrier frequencies includes at least first, second, and third carrier frequencies, wherein a frequency of the first carrier frequency is less than a frequency of the second carrier frequency, and wherein a frequency of the second carrier frequency is less than a. frequency of the third carrier frequency;
    determining a peak signal strength for each of the first, second, and third carrier frequencies while the first phase taper is applied; and
    applying a second phase taper to the antenna array of the phased array antenna system in response to a determination that the peak signal strength of the first carrier frequency is different than the peak signal strength of the third carrier frequency.

6. The method of claim 5, wherein the peak signal strength of the second carrier frequency is greater than the peak signal strengths of the first and third carrier frequencies.

7. The method of claim 6, wherein a slope between the peak signal strength of the first carrier frequency and the peak signal strength of the second carrier frequency and a slope between the peak signal strength of the second carrier frequency and the peak signal strength of the third carrier frequency are applied to a selection of the second phase taper.

8. The method of claim 5, wherein in response to a determination that the peak signal strength of the first carrier frequency is less than the peak signal strength of the third carrier frequency, the second phase taper steers a beam produced by the antenna system in a first direction.

9. The method of claim 8, wherein the peak signal strength of the second carrier frequency is greater than the peak signal strengths of the first and third carrier frequencies.

10. The method of claim 9, wherein a slope between the peak signal strength of the first carrier frequency and the peak signal strength of the second carrier frequency and a slope between the peak signal strength of the second carrier frequency and the peak signal strength of the third carrier frequency are applied to a selection of the second phase taper.

11. The method of claim 5, wherein in response to a determination that the peak signal strength of the first carrier frequency is greater than the peak signal strength of the third carrier frequency, the second phase taper steers a beam produced by the antenna system in a second direction.

12. The method of claim 11, wherein the peak signal strength of the second carrier frequency is greater than the peak signal strengths of the first and third carrier frequencies.

13. The method of claim 1, wherein the signal is an orthogonal frequency-division multiplexing signal.

14. The method of claim 1, wherein determining a peak signal strength for each of the first, second, and third carrier frequencies includes determining a received signal strength indication for each of the first, second, and third carrier frequencies.

15. A method for steering a phased array antenna system, comprising:
applying a first phase taper to an antenna array of the phased array antenna system;
receiving a signal spanning a plurality of frequencies at the phased array antenna while the first phase taper is applied, wherein the plurality of frequencies includes at least first, second, and third frequencies, wherein the first frequency is less than the second frequency, and wherein the second frequency is less than the third frequency;
determining a peak signal strength for each of the first, second, and third frequencies while the first phase taper is applied; and
applying a second phase taper to the antenna array of the phased array antenna system in response to a determination that the peal signal strength of the, first frequency is different than the peak signal strength of the third frequency.

16. The method of claim 15, wherein the signal is an orthogonal frequency-division multiplexing signal.

17. The method of claim 15, wherein determining a peak signal strength for each of the first, second, and third frequencies includes determining a received signal strength indication for each of the first, second, and third frequencies.

18. The method of claim 5, wherein the signal is an orthogonal frequency-division multiplexing signal.

19. The method of claim 5, wherein determining a peak signal strength for each of the first, second, and third carrier frequencies includes determining a received signal strength indication for each of the first, second, and third carrier frequencies.

20. The method of claim 4, wherein the signal is an orthogonal frequency-division multiplexing signal.

* * * * *

UNITED STATES PATENT AND TRADEMARK OFFICE
CERTIFICATE OF CORRECTION

PATENT NO. : 11,327,142 B2
APPLICATION NO. : 16/834491
DATED : May 10, 2022
INVENTOR(S) : Zachary T. Miers It is certified that error appears in the above-identified patent and that said Letters Patent is hereby corrected as shown below:

In the Claims

Claim 1, Column 9, Line 25, delete "phhased" and insert --phased-- therefor.

Claim 1, Column 9, Line 28, after "frequencies" insert --,--.

Claim 1, Column 9, Line 30, after the first instance of "carrier frequency" insert --, and wherein a frequency of the second carrier frequency is less than a frequency--.

Claim 1, Column 9, Line 31, delete the first instance of "of" and insert --for-- therefor.

Claim 4, Column 9, Line 62, after the first instance of "frequency" insert --of the first carrier frequency is less than a frequency of the second carrier frequency--.

Claim 5, Column 10, Line 17, delete "." appearing after the first instance of "a".

Claim 15, Column 12, Line 1, delete "peal" and insert --peak-- therefor.

Claim 15, Column 12, Line 1, delete "," appearing after the second instance of "the".

Signed and Sealed this
Eleventh Day of October, 2022

Katherine Kelly Vidal
*Director of the United States Patent and Trademark Office*